(12) United States Patent
LaPolice

(10) Patent No.: US 6,611,318 B2
(45) Date of Patent: Aug. 26, 2003

(54) ADJUSTABLE MIRROR FOR COLLIMATED BEAM LASER SENSOR

(75) Inventor: George D. LaPolice, Somerville, NJ (US)

(73) Assignee: Automatic Timing & Controls, Inc., Lancaster, PA (US)

( * ) Notice: Subject to any disclaimer, the term of this patent is extended or adjusted under 35 U.S.C. 154(b) by 0 days.

(21) Appl. No.: 09/815,880

(22) Filed: Mar. 23, 2001

(65) Prior Publication Data
US 2002/0135748 A1 Sep. 26, 2002

(51) Int. Cl.⁷ .............................. G01C 3/00; G01C 3/08
(52) U.S. Cl. ...................... 356/3.03; 356/3.05
(58) Field of Search .............. 356/3.01–3.05, 356/3.16

(56) References Cited

U.S. PATENT DOCUMENTS

| | | | |
|---|---|---|---|
| 2,506,946 A | * | 5/1950 | Walker |
| 2,582,728 A | * | 1/1952 | Walker |
| 3,614,449 A | | 10/1971 | Ward, III |
| 3,941,483 A | | 3/1976 | Ferrin |
| 4,200,397 A | | 4/1980 | Sick et al. |
| 4,250,498 A | | 2/1981 | Walter |
| 4,290,043 A | | 9/1981 | Kaplan |
| 4,291,977 A | | 9/1981 | Erdmann et al. |
| 4,313,654 A | * | 2/1982 | Matsui et al. |
| 4,336,997 A | | 6/1982 | Ross et al. |
| 4,346,293 A | | 8/1982 | Fetzer |
| 4,567,347 A | * | 1/1986 | Ito et al. |
| 4,605,850 A | | 8/1986 | Anselment et al. |
| 4,625,666 A | | 12/1986 | Sick |
| 4,660,970 A | * | 4/1987 | Ferrano |
| 4,798,965 A | | 1/1989 | Fetzer et al. |
| 4,825,091 A | * | 4/1989 | Breyer et al. |
| 4,899,041 A | | 2/1990 | Fetzer et al. |
| 4,983,043 A | * | 1/1991 | Harding ...................... 356/376 |
| 5,008,695 A | * | 4/1991 | Nagaoka et al. |
| 5,015,868 A | * | 5/1991 | Park |
| 5,455,669 A | | 10/1995 | Wetteborn |
| 5,530,548 A | * | 6/1996 | Campbell et al. ............ 356/375 |
| 5,648,852 A | | 7/1997 | Kato et al. ................... 356/375 |
| 5,874,719 A | | 2/1999 | Hippenmeyer et al. |
| 5,929,424 A | | 7/1999 | Fowler |
| 5,949,530 A | | 9/1999 | Wetteborn |

FOREIGN PATENT DOCUMENTS

| | | |
|---|---|---|
| DE | 3150642 | 7/1983 |
| DE | 4115013 | 5/1992 |
| EP | 0601847 | 6/1994 |
| EP | 0709798 | 5/1996 |
| EP | 0 801315 | 10/1997 |
| EP | 0 935142 | 8/1999 |
| JP | 5540959 | * 3/1980 |
| JP | 57198804 | * 12/1982 |
| NL | 9002463 | 6/1992 |

* cited by examiner

Primary Examiner—Stephen C. Buczinski

(57) ABSTRACT

A laser diode (22) emits laser light which is collimated into parallel rays with a collimating lens (24). The collimated beams travel about 5 to 50 cm before being reflected back to an adjustable mirror (28), to a fixed mirror (30), and then on to a photoreceiver (34). The adjustable mirror (28) is pivoted by turning an adjusting screw (40). The adjustable mirror (28) has a toothed cam (48) on its backside that mate with the threads of the adjusting screw (40). When the adjusting screw (40) is turned, it forces the cam to move with it, thus changing the angle of the adjustable mirror (28). A ball lens (32) focuses the reflected light onto the photoreceiver (34). The photoreceiver (34) and laser diode (22) are synchronized so that the receiver (34) can only receive light during appropriate windows of time corresponding to when the laser light was emitted. The photoreceiver (34) has the ability to tell when it is and when it is not receiving laser light and has the ability to initiate action based upon that information.

17 Claims, 4 Drawing Sheets

ADJUSTABLE MIRROR FOR COLLIMATED BEAM LASER SENSOR

BACKGROUND OF THE INVENTION

The present invention relates to the laser sensor art. It finds particular application when detecting objects at very short distances and will be described with particular reference thereto.

Laser sensors have a rather extensive variety of applications in many fields. They are used to provide an easily perturbable equilibrium, such as in a security system. They also gauge the location and orientation of moving objects, such as on an assembly line. They are also used to judge the distance from the sensor to a target. In general, laser sensors are useful when information about a remote object is desired, such as whether the object is present and, if so, its distance.

Heretofore, laser sensors have included a laser diode or other laser source which was focused to a preselected focal length by a convergent focusing lens. Laser light reflected from a reflector or reflective surface was received by another convergent lens with a relatively long focal length and focused on a photodiode detector. The output of the photodiode was monitored and an electronic signal was generated indicative of the reception of the reflected laser beam or the absence of the reflected laser beam. In order to distinguish between the reflected laser beam and stray light of like color, some laser sensors included a feedback system, such as a continuous wave type feedback system, between the laser source and the detector.

Although successful, such prior laser sensors have drawbacks. In general, the use of a convergent light beam requires one focal point to be set at the point of convergence. As a result, different focal lengths require different lenses. A design is desired that will allow different focal lengths without having to change between different lenses.

The present invention provides a new and improved laser method and apparatus that solves the above referenced problems and others.

SUMMARY OF THE INVENTION

In accordance with one aspect of the present invention, a laser is provided. A laser diode emits laser light. A collimating lens mounted adjacent the laser diode collimates the emitted laser light. Reflected laser light encounters a pivotable mirror whose angle selects a convergence distance. A photoreceiver receives reflected laser light from the adjustable mirror and produces an output signal indicative of the receipt/non-receipt of reflected laser light.

In accordance with another aspect of the present invention, a method of laser sensing is provided. Laser light is emitted and collimated into a collimated beam. The collimated beam is transmitted across a region and is reflected off a target object back across the region and reflected from an adjustable mirror, which mirror was adjusted to set a convergence distance. The laser light reflected from the adjustable mirror is detected. A presence/absence of reflected laser light is determined.

One advantage of the present invention is that it senses over ranges of about 5 to 50 cm.

Another advantage of the present invention is that no lens replacements are required to change between distance ranges. The same sensor can be used for all distances within the range of the apparatus without lens changes.

Another advantage is ease of alignment on small targets.

Another advantage resides in insensitivity to background objects beyond a point of convergence.

Yet another advantage of the present invention is that it provides extremely accurate spatial data.

Still further benefits and advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
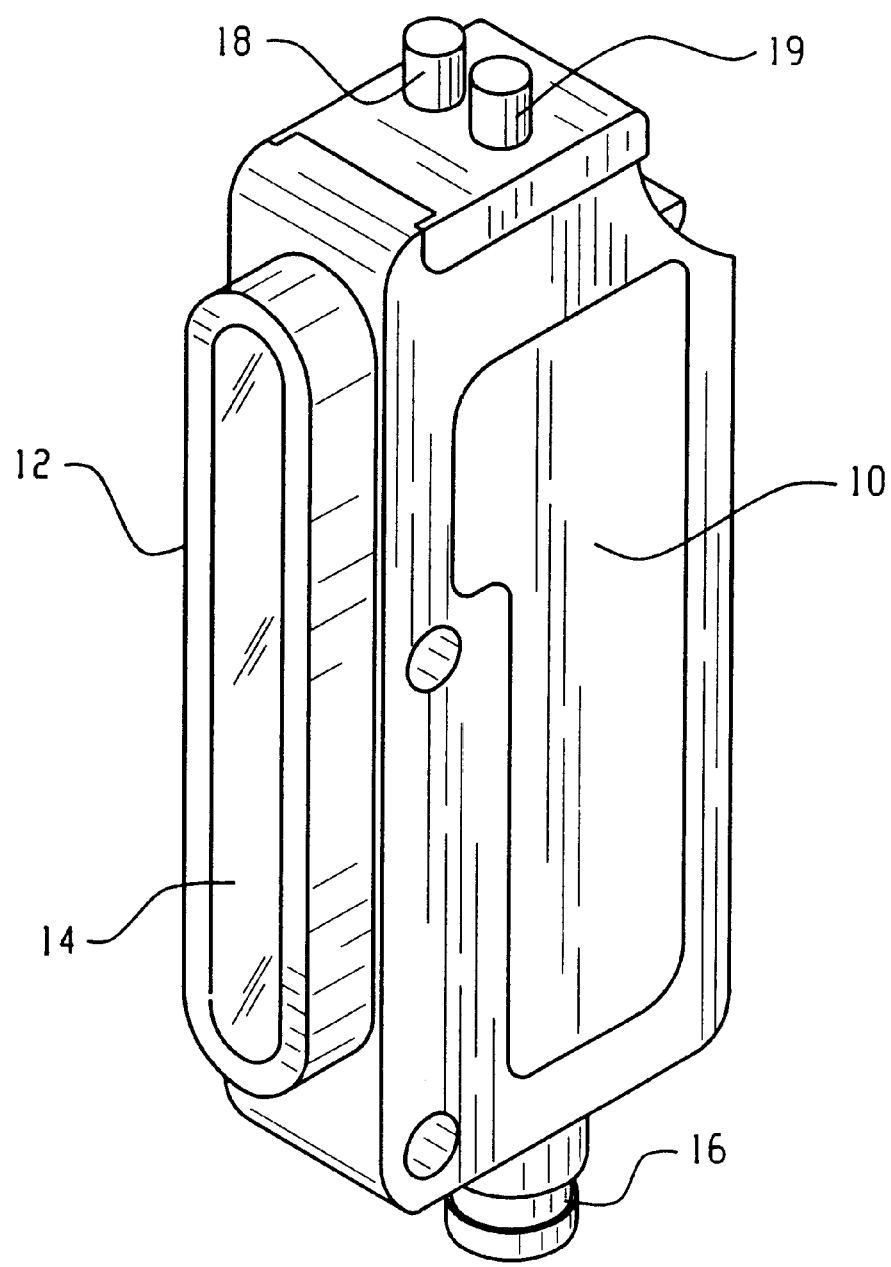
FIG. 1 is a perspective view of a laser sensor in accordance with the present invention.

With reference to FIG. 1, a laser sensor includes a housing 10 including a forward projecting portion 12. The forward projecting portion includes a window 14 through which a laser beam is projected and through which reflected laser light is received. An electrical fitting or connector 16 at the base of the housing 10 includes contacts for receiving electrical power in and sending signals out indicative of whether or not the laser beam is reflected back. Indicator lights, such as red and green LEDs 18, 19 mounted on the exterior of the housing 10, provide a user with a local, visual indication regarding whether the beam is reflected and whether the laser sensor is powered.

Figure 2:
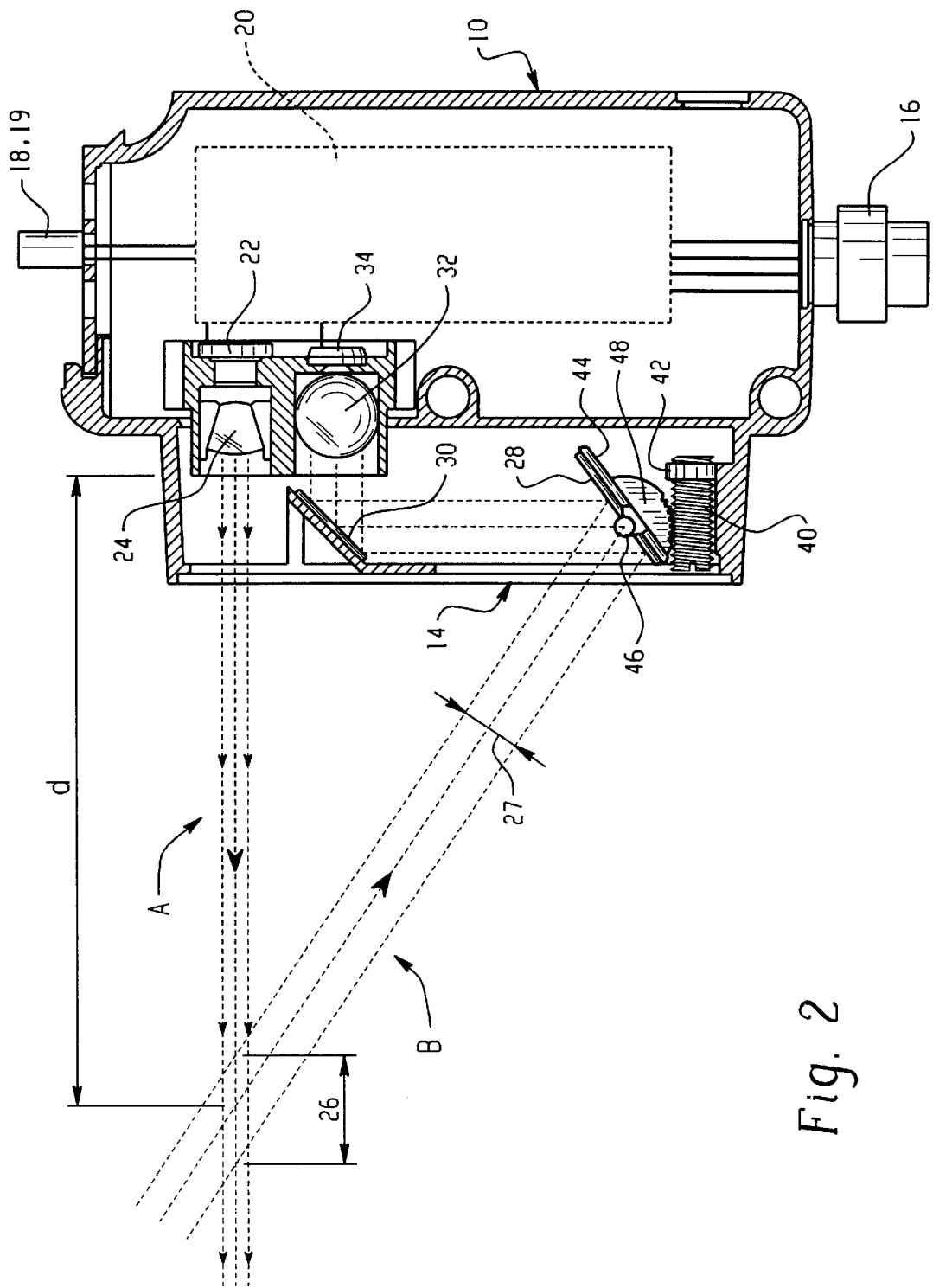
FIG. 2 is a side sectional view illustrating optical and opti-electrical components of the laser sensor of FIG. 1.

With reference to FIG. 2, a circuit board 20 carries the circuit that operates the laser detector, which is described below. A laser diode 22, emitting in the visible red range of the electromagnetic spectrum in the preferred embodiment, is supported behind and optically coupled to a collimating lens 24. The collimating lens is mechanically mounted adjacent the laser diode 22. The collimating lens collimates the light output from the laser diode into parallel rays, rather than focusing it on a focal point at a selected distance. The collimating lens causes a laser beam of parallel rays A to be emitted without converging to a focal point. The collimated parallel rays A are more forgiving of object size and target distance relative to focused beams. As a result of the preferred beam geometry, that is, a "tube" of parallel rays rather than converging rays, the detector has a fairly large sensing area which is a three-dimensional volume at the intersection of the beam A and a field of view of the detector. This embodiment is easier to align on small targets and sense varying distances within the range of the sensor.

When the light strikes an object at a convergence area 26 of the collimated light beam A and a field or cylinder of view 27 of the detector, a portion B of the light is reflected back towards the laser sensor. The reflected laser light B returning through the window 14 encounters a pivotally mounted mirror 28 which reflects the light onto a fixed mirror 30. The light is reflected once again and encounters a receiving lens 32 which focuses the light onto an active surface of a photoreceiver 34. In the preferred embodiment, the receiving lens 32 is a ball lens.

Alternatively, there is no fixed mirror 30 and the receiving lens 32 is mounted in its place to receive light directly from the pivoting mirror 28. The advantage of including the fixed mirror 30 is that it allows the accuracy of the laser sensor to be selected. If the fixed mirror 30 were made extremely small, then the laser sensor will only detect object over a very small distance from the convergence point. As the fixed mirror 30 is increased in size, the laser sensor becomes more forgiving of object position, and responds to a greater range of distances from the convergence point of the collimated light beam and the field of view of the detector.

The receiving lens 32 has a large field of view which adds flexibility in target size and target distance. The receiving lens 32 preferably has a very short focal length, on the order of its radius, about 6.3 mm in the preferred embodiment, for focusing parallel and other rays on the photoactive surface. Receiving lenses with diameters of 3–12 mm are also contemplated. Moreover, the receiving lens 32 has a high efficiency due to its low f-number, (focal length÷aperture). An f-number less than one is preferred with an f-number of 0.6–0.7 being optimal. The index of refraction of the receiving lens 32 is selected relative to the wavelength of the selected light such that the light is focused substantially on the circumference of the receiving lens 32, which abuts the photosensitive receiver 34. An index of refraction of 1.5±0.1 at 650 nm is preferred. For visible red light, glass, acrylic, polycarbonate, polystyrene, and other optical materials are preferred for forming the receiving lens 32. The receiving lens 32 can also be tinted to function concurrently as a filter.

Other receiving lenses 32 are also contemplated. Other lenses with an f-number of less than 1.0 can also produce satisfactory results.

Optical lasers in the near infrared range, preferably below 1100 nanometers, are also contemplated. The use of lasers with significantly higher or lower wavelengths is also contemplated, provided a sensor which is sensitive to that wavelength is selected. Optionally, a phosphor which is energized by one wavelength, (that of the laser diode) and which emits light of another wavelength, (that of the receiver) may be used as an interface between mismatched lasers and detectors.

The angle of the pivoting mirror 28 relative to the collimated light A is changed by turning an adjusting screw 40. The screw 40 is held in a slip collar 42 which prevents longitudinal or lateral displacement, permitting rotation. In the preferred embodiment, the pivoting mirror 28 has a support or backing 44 that is mounted to the housing by a pair of pivots 46 The support 44 has a rounded cam with teeth 48 that engage threads of the adjusting screw 40. By turning the adjusting screw 40, the teeth 48 force the cam to move, and thus, the angle of the mirror 28 is changed. This action allows the convergence region 26 of the collimated beam and the detector field of view to be precisely selected anywhere from about 5 to 50 cm from the detector. The range is controlled by the degree of freedom through which the pivoting mirror 28 can move.

In the preferred embodiment, the angle of the pivoting mirror 28 is set and fixed in the factory in accordance with the application and the required focal length of the application. Fixing the pivoting mirror 28 in the factory is preferred because of the sensitivity of the device. Very small variations of the angle of the pivoting mirror 28 will produce shifts in the distance to the convergence spot 26. Once the convergence distance is set, the window 14 is set in place to prevent unauthorized readjustment.

Alternatively, the end user can adjust the pivoting mirror by manipulating the adjusting screw 40. The advantage of using a screw to adjust the pivoting mirror 28 over other means, is that the screw 40 allows for an infinite number of distances d, where the collimated laser beam spot and the detector field of view converge as opposed to other means of adjustment. Further, the screw's mechanical advantage inhibits vibration or other factors from changing the focus.

Figure 3:
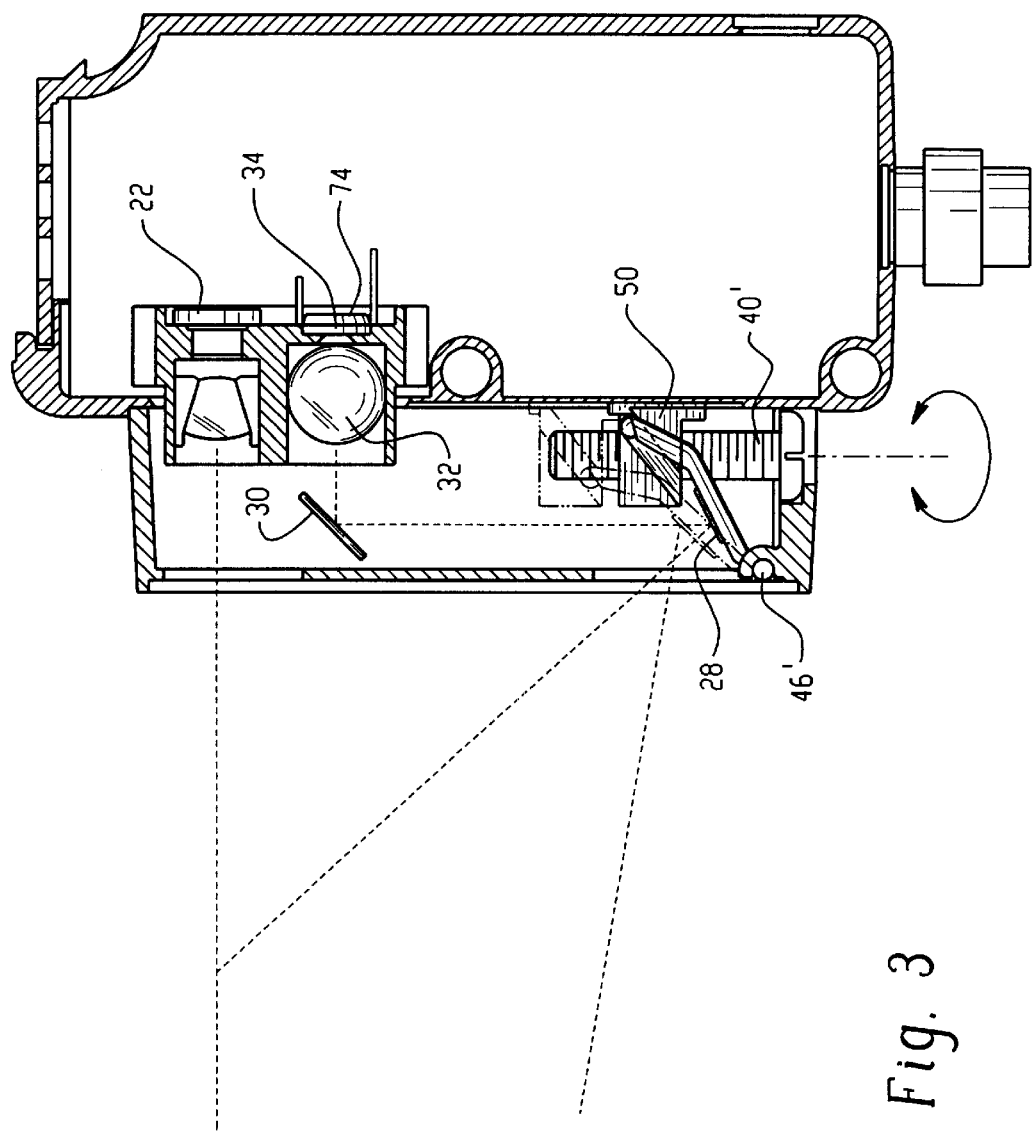
FIG. 3 is a sectional view illustrating an alternative embodiment of the laser sensor; and, FIG. 4 is a circuit diagram of the laser sensor of FIG. 1.

With reference to FIG. 3, the pivot 28' can be located at other locations. Similarly, a vertical screw 40' can be used to move a traveler 50 which adjusts the angular orientation of the mirror 28.

Alternately, a pin or detent locks the mirror into one of multiple preset incremental positions about the pivot 46. In another alternative, the position of the mirror is vertically adjusted. By having a fixed mirror angle and using vertical adjustments, the focus point is shifted as a function of the new geometry (the distance between the adjustable and fixed mirrors).

If there is an object at the convergence point 26, laser light is reflected back to the pivoting mirror 28, up to the fixed mirror 30, and on to the photodetector 34. If the object is not at the convergence point, laser light may be reflected back to the pivoting mirror 28, but will be incident at an improper angle to be reflected to the photodetector 34, and thus, will be absorbed somewhere in the housing 10. The distance between the fixed mirror 30 and the pivoting mirror 28 in the preferred embodiment is approximately 2.5 cm, or as far apart as the housing 10 will allow. The laser sensor distinguishes the difference between when it is not receiving laser light reflected from the convergence point 26 and when it is, indicating there is an object at the convergence point 26.

Figure 4:
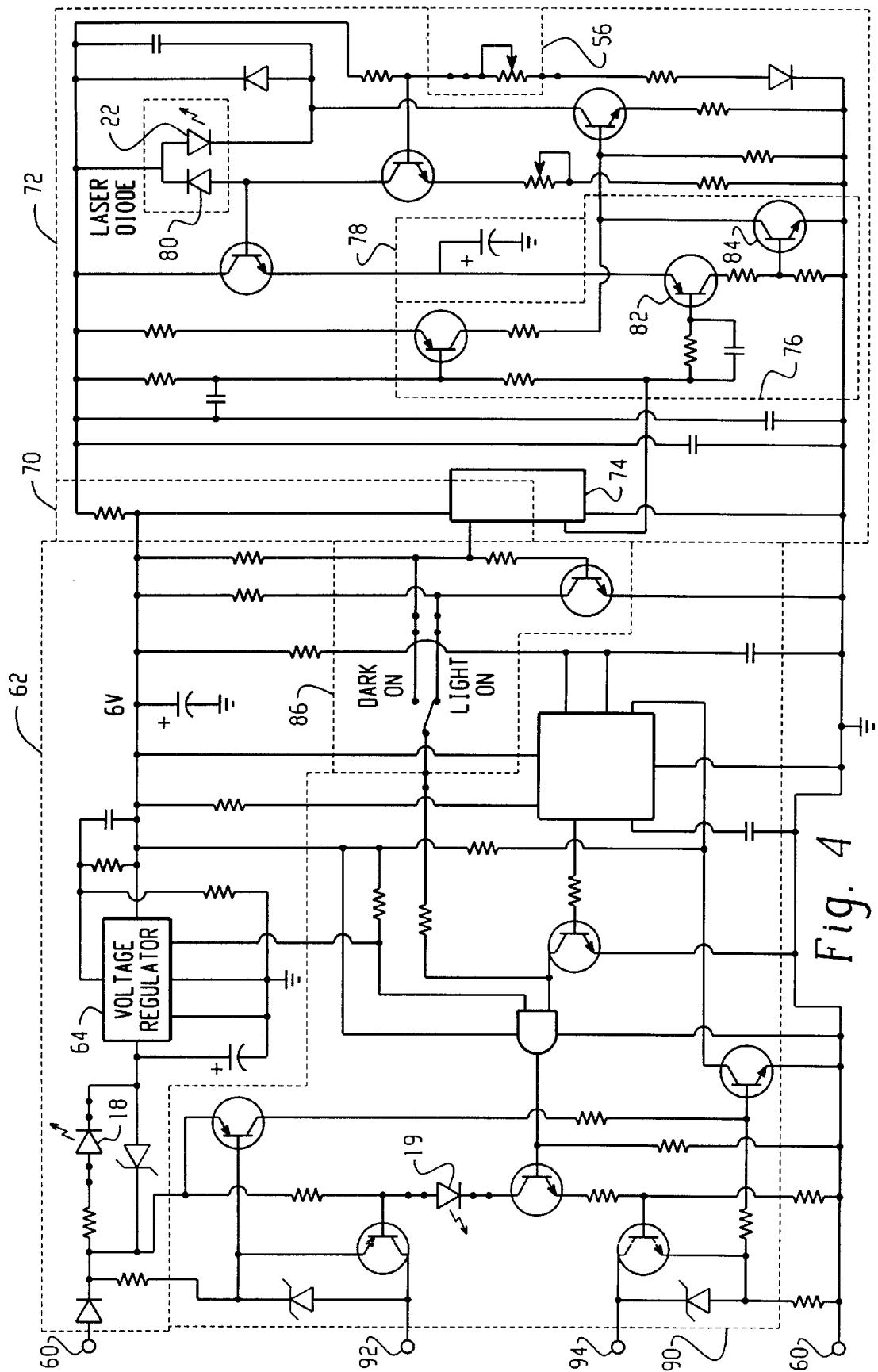

With reference to FIG. 4, a DC voltage contact and a ground contact pair 60 are physically located in the electrical connector 16. The contacts 60 preferably receives 10–30 volts DC. A power conditioning circuit 62 including a voltage regulator chip 64 converts the received power into a regulated 6 volts.

The regulated voltage powers a sensing circuit 70 and a laser drive circuit 72. More specifically, the sensing circuit includes a pulse modulation synchronous detector chip 74, such as a Sharp IS450, which includes the photosensor 34. The synchronous detector chip includes the light sensitive circuit, accompanying amplification and signal conditioning circuitry, and the like. In the preferred embodiment, the same chip also includes the synchronization circuitry, although such circuitry could be provided separately. That is, the chip 74 further generates pulses for pulsing the laser diode 22 and an internal comparitor for comparing whether received light is received at an appropriate timing relative to the pulsing of the laser diode. Based on the reaction speed of the laser diode, the travel time of the light from the laser diode to the reflective surface and back to the photosensitive surface, and the speed of the circuitry within the detector chip 74, there is a known time interval or window within which reflected laser light is received. The comparitor filters out any light received at other times.

The pulse modulation output of the detector chip 74 is connected to a gated feedback circuit 76 for turning the laser diode ON and OFF. A reference voltage source 78 provides the laser diode assembly with a regulated reference voltage that is proportional to the amount of emitted light to provide an automatic, dynamic intensity adjustment. The reference voltage source is connected to a photodiode 80 mounted behind the laser diode 22 for sensing its output. The gated feedback circuit includes switches 82, 84 for switching the reference voltage from the reference voltage source 78 in and out for sharper pulses, particularly for faster rise times and less phase delay without excessive over-shoot of the laser drive current. The faster rise time and less phase delay allows the circuit to function with the synchronous detection circuitry with little degradation and performance while limiting destructive leading edge current peaks caused by the inherent lag in the response of the feedback monitoring photodiode 80.

When the detection circuit 74 detects reflected laser light, it outputs a signal to a dark-on/light-on selection circuit 86. That is, depending on the application, it may be advantageous to have an output signal when reflected light is received or it may be advantageous to have an output signal whenever no reflected light is received.

An output circuit 90 shapes the output signal to control a pair of analogous output transistors to produce a PNP output on a PNP output terminal 92 and an NPN output on an NPN output terminal 94. The output terminals 92, 94, which are again located in the electrical connector 16, carry the high and low signals from the transistors to downstream equipment.

The invention has been described with reference to the preferred embodiments. Obviously, changes and modifications will occur to those of normal skill in the art upon reading and understanding of the detailed description. The present invention is meant to include all such modifications so long as they fall within the scope of the appended claims or the equivalents thereof.

Having thus described the preferred embodiment, the invention is now claimed to be:

1. A laser sensor comprising:
    a laser diode which defines a light source;
    a collimating lens mounted adjacent the laser diode for collimating light from the light source into parallel rays;
    an adjustable mirror for reflecting laser light reflected from an object positioned at a selected convergence distance to a photoreceiver for receiving laser light reflected from the adjustable mirror and producing an output signal indicative of receipt/non-receipt of reflected laser light;
    a pivot about which the adjustable mirror is pivotable to adjust the convergence distance, light reflected from an object at the convergence distance being reflected onto the photoreceiver and light reflected from objects displaced from the convergence distance being not received by the photodetector;
    a manually turned screw which directly engages a toothed support for the mirror, such that rotation of the screw translates the teeth and pivots the adjustable mirror about the pivot to set an angle of the mirror to select and fix the selected convergence distance.

2. The laser sensor as set forth in claim 1, further including a fixed mirror mounted in front of the photoreceiver that reflects light from the adjustable mirror onto the optical lens.

3. The laser sensor as set forth in claim 1, wherein the photoreceiver includes:
    a synchronous detector, the photoreceiver generating enable signals for intermittently enabling driving the laser diode and comparing whether received light temporally corresponds to periods in which the laser diode was enabled.

4. The laser sensor as set forth in claim 1, wherein the convergence distance is adjustable from 5 to about 50 cm.

5. A laser sensor comprising:
    a laser diode which emits laser light;
    a collimating lens mounted adjacent the laser diode for collimating the emitted laser light into parallel rays;
    an adjustable mirror mounted displaced from the collimating lens which reflects laser light reflected from an object positioned at a convergence distance to an optical lens having an f-number less than 1.0;
    a pivot about which the adjustable mirror is pivotable;
    an adjustment mechanism which adjusts and fixes an angular position of the mirror about the pivot for setting the convergence distance of the sensor;
    a fixed mirror mounted adjacent the collimator lens to reflect light from the adjustable mirror onto the optical lens;
    a photoreceiver disposed adjacent the optical lens for receiving laser light reflected from the adjustable and fixed mirrors and focused by the optical lens to produce an output signal indicative of receipt/non-receipt of reflected laser light.

6. The laser sensor as set forth in claim 5, wherein the optical lens has an f-number of 0.6–0.7.

7. The laser sensor as set forth in claim 5, wherein the optical lens is a ball lens.

8. A laser sensor comprising:
    a laser diode which emits light;
    a collimating lens mounted adjacent the laser diode for collimating the emitted laser light;
    an adjustable mirror for selecting a convergence distance of the sensor and reflecting laser light reflected from an object positioned at the convergence distance;
    a pivot about which the adjustable mirror is pivotable;
    a screw constrained against longitudinal movement;
    a follower connected with the adjustable mirror which threadingly engages threads of the screw, such that rotation of the screw pivots the adjustable mirror about the pivot;
    a photoreceiver for receiving laser light reflected from the adjustable mirror and producing an output signal indicative of receipt/non-receipt of reflected laser light; and,
    a fixed mirror mounted in front of the photoreceiver that reflects light from the adjustable mirror onto the optical lens.

9. The laser sensor as set forth in claim 8, wherein the follower includes a threaded curved cam surface connected to the mirror.

10. A laser sensor comprising:
    a housing;
    a laser diode within the housing;
    a collimating lens within the housing mounted adjacent the laser diode for collimating laser light emitted by the laser diode into parallel rays;
    an adjustable mirror within the housing;
    a pivot about which the adjustable mirror is pivotable;
    a set screw within the housing which directly engages a toothed support for the mirror, such that rotation of the screw translates teeth of the mirror support and pivots the adjustable mirror about the pivot for setting and fixing a convergence distance;
    a photoreceiver within the housing for receiving laser light reflected from an object at the convergence distance to the adjustable mirror and from the adjustable mirror to the photoreceiver, light reflected from objects displaced from the convergence distance being not reflected to the photodetector, the photoreceiver producing an output signal indicative of receipt/non-receipt of reflected laser light;

the housing having an opening through which (a) collimated laser light from the collimating lens exits, (b) reflected light from the object at the convergence distance enters to strike the adjustable mirror, and (c) which provides access to the screw; and, a translucent window which is sealingly mounted over the opening, such that once the window is mounted in place closing the opening, tampering with the screw is blocked.

11. The laser sensor as set forth in claim 10, wherein the laser diode emits light in a visible red to near infrared spectrum range and the optical lens has an index of refraction of about 1.4–1.6 at 650 nm.

12. A laser sensor comprising:

a means for selecting a convergence distance of between 5 to about 50 cm including a pivotable mirror whose angular position sets the selected convergence distance and a screw for adjustably setting the angular position of the pivotable mirror;

a laser light source;

a means for collimating light from the laser light source into a collimated beam which is transmitted across a region of interest, the collimated beam being reflected back from a reflective object across the region of interest at the convergence distance to the pivotal mirror, which pivotal mirror reflects only reflected light reflected at the convergence distance onto a photodetector means for detecting the reflected laser light; and, a means for determining a presence/absence of detected, reflected laser light.

13. A method of laser sensing comprising:

selecting a convergence distance by adjusting an angle of an adjustable mirror by turning a screw which cams the adjustable mirror to pivot about a pivot point;

with the screw, holding the mirror at a fixed angle to prevent the selected convergence distance from changing;

emitting laser light;

collimating the laser light into a collimated beam;

transmitting the collimated beam across a region of interest;

if a reflective object is present at the convergence distance, reflecting the collimated laser beam back from the object across the region of interest to the adjustable mirror which is angled to reflect only light from the convergence distance to a detection point;

detecting the laser light reflected from the adjustable mirror to the detection point; and, determining a presence/absence of an object in the collimated laser beam from a presence/absence of reflected laser light at the detection point.

14. A method of laser sensing comprising:

selecting a convergence distance by turning a screw to adjust an angle of an adjustable mirror;

emitting laser light;

collimating the laser light into a collimated beam;

transmitting the collimated beam across a region of interest;

if a reflective object is present at the convergence distance, reflecting the collimated laser beam back from the object across the region of interest;

reflecting the reflected collimated laser beam with the adjustable mirror;

detecting the laser light reflected from the adjustable mirror; and, determining a presence/absence of detected, reflected laser light.

15. The method as set forth in claim 14, further including:

after adjusting the adjustable mirror angle, blocking access to the screw to prevent tampering.

16. The method as set forth in claim 14, further including:

synchronously controlling intermittent generation of the laser light and detection of the received laser light to distinguish between received laser light and received stray light.

17. A method of laser sensing comprising:

selecting a convergence distance by adjusting an angle of an adjustable mirror by turning a screw thereby camming the adjustable mirror to pivot about a pivot point;

mounting a translucent window in front of a collimating lens, the adjustable mirror, and the screw preventing further access to and rotation of the screw, fixing the convergence distance;

emitting laser light;

collimating the laser light into a collimated beam with the collimating lens;

transmitting the collimated beam across a region of interest;

if a reflective object is present at the convergence distance, reflecting the collimated laser beam back from the object across the region of interest;

reflecting the reflected collimated laser beam with the adjustable mirror;

detecting the laser light reflected from the adjustable mirror; and, determining a presence/absence of detected, reflected laser light.

* * * * *